(12) United States Patent
Connell, II

(10) Patent No.: US 9,275,462 B2
(45) Date of Patent: Mar. 1, 2016

(54) EFFICIENT VISUAL SURFACE FINDING

(71) Applicant: International Business Machines Corporation, Armonk, NY (US)

(72) Inventor: Jonathan H. Connell, II, Cortlandt-Manor, NY (US)

(73) Assignee: International Business Machines Corporation, Armonk, NY (US)

(*) Notice: Subject to any disclaimer, the term of this patent is extended or adjusted under 35 U.S.C. 154(b) by 266 days.

(21) Appl. No.: 14/041,835

(22) Filed: Sep. 30, 2013

(65) Prior Publication Data

US 2015/0063722 A1 Mar. 5, 2015

Related U.S. Application Data

(63) Continuation of application No. 14/017,512, filed on Sep. 4, 2013.

(51) Int. Cl.
*G06K 9/00* (2006.01)
*G06T 7/00* (2006.01)
*G06T 17/10* (2006.01)

(52) U.S. Cl.
CPC ............ *G06T 7/0065* (2013.01); *G06T 7/0057* (2013.01); *G06T 17/10* (2013.01); *G06T 2207/20021* (2013.01)

(58) Field of Classification Search
CPC ... G06T 17/10; G06T 19/003; G06T 2200/04; G06T 2200/08; G06T 2210/21; G06T 7/0065; G06T 7/0057; G06T 2207/20021
See application file for complete search history.

(56) References Cited

U.S. PATENT DOCUMENTS

| | | | |
|---|---|---|---|
| 2009/0213219 A1 | 8/2009 | Eggert et al. | |
| 2011/0040427 A1 | 2/2011 | Ben-Tzvi | |
| 2011/0123135 A1 | 5/2011 | Hsieh et al. | |
| 2012/0121132 A1 | 5/2012 | Asahara et al. | |
| 2012/0197439 A1 | 8/2012 | Wang et al. | |
| 2012/0197464 A1 | 8/2012 | Wang et al. | |
| 2013/0114858 A1 | 5/2013 | Allezard et al. | |
| 2014/0300703 A1* | 10/2014 | Ito | H04N 13/0239 348/47 |
| 2015/0063721 A1* | 3/2015 | Connell, II | G06T 17/10 382/285 |
| 2015/0063722 A1 | 3/2015 | Connell, II | |

FOREIGN PATENT DOCUMENTS

| | | |
|---|---|---|
| EP | 002071515 A1 | 6/2009 |
| WO | WO 2012/007382 A1 | 1/2012 |

OTHER PUBLICATIONS

Kircali et al., "Ground Plane Detection Using an RGB-D Sensor", Sep. 25, 2014, Springer International Publishing, Proc. of the 29th Int. Symposium on Conmputer and Information Sciences, art II, p. 69-77.*

(Continued)

*Primary Examiner* — Stephen R Koziol
*Assistant Examiner* — Timothy Choi
(74) *Attorney, Agent, or Firm* — Anne V. Dougherty, Esq.; McGinn IP Law Group PLLC

(57) ABSTRACT

A method and non-transitory program for determining a plane in a depth image includes dividing a portion of a depth image into a plurality of areas, fitting a two-dimensional line to depth points in each of the plurality of areas, and combining two or more of the plurality of two-dimensional lines to form a three-dimensional plane estimate.

14 Claims, 9 Drawing Sheets

(56) References Cited

OTHER PUBLICATIONS

Kircali et al., "Ground Plane Detection using Kinect sensor", Apr. 26, 2013, IEEE, 21st Signal Processing and Communications Applications Conference, p. 1-4.*

Correa et al., "Mobile Robots Navigation in Indoor Environments Using Kinect Sensor", May 25, 2012, IEEE, 2012 2nd Brazillian Conf. on Critical Embedded Systems, p. 36-41.*

Georgiev et al., "Fast Plane Extraction in 3D Range Data Based on Line Segments", Sep. 30, 2011, IEEE/RSJ, 2011 Int. Conf. on Intelligent Robots and Systems., p. 3808-3815.*

Holz et al., "Real-time plane segmentation using RGB-D cameras", Jun. 18, 2012, Springer-Verlag, Robot Soccer World Cup XV, p. 306-317.*

Labayrade et al., "Real time obstacle detection in stereovision on non flat road geometry through "v-disparity" representation", Jun. 21, 2002, IEEE, Intelligent Vehicle Symposium, vol. 2, p. 646-651.*

A. Luca Iocchi, et al. Building 3d maps with semantic elements integrating 2d laser, stero vision and imu on a mobile robot, 2007.

United States Office Action dated Jul. 7, 2015 in U.S. Appl. No. 14/017,512.

Wikipedia, "Kinect", Aug. 27, 2012, Wikipedia.org, https://en.wikipedia.org/w/index.php?title=Kinect&oldid=Kinect&oldid=509466481, p. 1-18.

* cited by examiner

EFFICIENT VISUAL SURFACE FINDING

The present Application is Continuation Application of U.S. patent application Ser. No. 14/017,512, filed on Sep. 4, 2013, the entirety which is incorporated herein by reference.

BACKGROUND OF THE INVENTION

1. Field of the Invention

The present invention generally relates to a method and system for efficiently finding a surface.

2. Description of the Related Art

It is useful for robots to find supporting surfaces, such as tables and floors, in their environment. Deviations from these surfaces can then be interpreted as obstacles to navigate around (e.g., on the floor) or possible objects to manipulate (e.g., on a table). The navigation aspect also applies to self-guided vehicles on roads or in warehouses.

One popular solution is to obtain a 3D (3-dimensional) point cloud from a sensor such as Microsoft's Kinect®. As shown in FIG. 1, a set of three points is chosen which uniquely defines a plane on which they all rest. This is repeated for another set of three points, and another, etc. in a RANSAC (random sample consensus) manner. The point triads then vote for a plane in a Hough space for a set of parameters such as tilt, roll, and height of the plane. From the vote densities and various other constraints (e.g., expected plane height), the "best" plane parameter set is found. Based on this, deviations in the scene can be assessed.

However, this method requires a large amount of computation. For a Video Graphics Array (VGA) resolution depth image there may be n=300,000 points. There are roughly $n^3$ combinations of points that could be chosen, or roughly $2 \times 10^{16}$ sets! This could be reduced to, say, 1% of all points by stochastic sampling, or by dividing the image into 10×10 pixel grid cells and selecting a single point from each cell. However, this still leaves $2 \times 10^{10}$ triads, which can take a long time to evaluate. Yet the combinations cannot be reduced much more without fear of missing a plane with a small surface size.

Another approach would be to take the 3D convex hull of the point cloud as illustrated in FIGS. 2a-2c. This can be done reasonably efficiently in n*log n time (or n*log h, where h is the number of points on the hull). The facets of the hull are then candidate planes. Alternatively, a mesh reduction and approximation scheme can be used to consolidate similar patches on the hull into larger facets (planes). The resulting set of facets is then examined, possibly in light of further external constraints, to find the surface of interest. Once again, from the selected surface the remainder of the original depth image can be evaluated to find deviations from the plane.

Unfortunately, the convex hull algorithm requires that the plane be a true extrema in the environment. For instance, gazing from a landing down a flight of stairs would return a "fictitious" surface that followed the creases in the steps.

Still another method for finding the floor, or another flat surface, is by direct plane sweeping. As illustrated in FIGS. 3a and 3b, one guesses a plane and then moves it through the point cloud accumulating evidence. A threshold can be set so that small regions still contribute to the evidence for a particular plane. However, the method is very time consuming because there are a very large number of offsets and orientations to try.

SUMMARY OF THE INVENTION

In view of the foregoing, and other, exemplary problems, drawbacks, and disadvantages of the conventional systems, it is an exemplary aspect of the present invention to provide a system and method capable of finding a surface in an image.

It is, therefore, an exemplary feature of the present invention to provide a structure and method for efficiently finding a surface.

In a first exemplary aspect of the invention, to achieve the above and other features and purposes, described herein is a method for determining a plane in a depth image, the method including dividing a portion of a depth image into a plurality of areas, fitting a two-dimensional line to depth points in each of the plurality of areas, and combining two or more of the plurality of two-dimensional lines to form a three-dimensional plane estimate An exemplary aspect of method may include the fitting the two-dimensional line further includes dividing the area into a plurality of scan lines, selecting a farthest depth point of a set of the depth points on each of the plurality of scan lines, discarding depth points with are not further away than the farthest depth point on an adjacent scan line of the plurality of scan lines, and fitting remaining depth points of the set of the depth points so as to calculate the two-dimensional line.

In an exemplary aspect of the method, the combining the two or more of the plurality of two-dimensional lines to form the three-dimensional plane includes selecting a two-dimensional line of the two-dimensional lines having a greatest offset, selecting another two-dimensional line of the two-dimensional lines having a closest offset to the two-dimensional line, and comparing the two-dimensional line with the other two-dimensional line and adding the other two-dimensional line to three-dimensional plane estimate if the comparison is acceptable.

An exemplary aspect of method may further include determining environmental areas consistent with the three-dimensional plane estimate. The areas consistent with the three-dimensional plane estimate are considered obstacle-free.

An exemplary aspect of method may further include determining areas inconsistent with the three-dimensional plane estimate. The areas inconsistent with the three-dimensional plane estimate are interpreted as objects.

An exemplary aspect of method may further include rotating the depth image by 90 degrees such that a substantially vertical surface becomes a substantially horizontal surface in the image.

An exemplary aspect of method may further include determining compact areas inconsistent with the three-dimensional plane estimate. The areas inconsistent with the three-dimensional plane estimate are interpreted as manipulable members for alteration of environmental structures.

Another exemplary aspect of the invention is a non-transitory computer-readable medium tangibly embodying a program of machine-readable instructions executable by an apparatus to perform a method of determining a plane. The method includes dividing a portion of a depth image into a plurality of areas, fitting a two-dimensional line to depth points in each of the plurality of areas, and combining two or more of the plurality of two-dimensional lines to form a three-dimensional plane estimate.

An exemplary aspect of the non-transitory computer-readable medium according may further include dividing the area into a plurality of scan lines, selecting a farthest depth point of a set of the depth points on each of the plurality of scan lines, discarding depth points with are not further away than the farthest depth point on an adjacent scan line of the plurality of scan lines, and fitting remaining depth points of the set of dept points so as to calculate the two-dimensional line.

An exemplary aspect of the non-transitory computer-readable medium the combining the two or more of the plurality of two-dimensional lines to form the three-dimensional plane may include selecting a two-dimensional line of the two-dimensional lines having a greatest offset, selecting another two-dimensional line of the two-dimensional lines having a closest offset to the two-dimensional line, and comparing the two-dimensional line with the other two-dimensional line and adding the other two-dimensional line to three-dimensional plane estimate if the comparison is acceptable.

An exemplary aspect of the non-transitory computer-readable medium according may further include determining environmental areas consistent with the three-dimensional plane estimate, wherein the areas consistent with the three-dimensional plane estimate are considered obstacle-free.

An exemplary aspect of the non-transitory computer-readable medium according may further include determining areas inconsistent with the three-dimensional plane estimate. The areas inconsistent with the three-dimensional plane estimate are interpreted as objects.

An exemplary aspect of the non-transitory computer-readable medium according may further include rotating the depth image by 90 degrees such that a substantially vertical surface becomes a substantially horizontal surface in the image.

An exemplary aspect of the non-transitory computer-readable medium according may further include determining compact areas inconsistent with the three-dimensional plane estimate. The areas inconsistent with the three-dimensional plane estimate are interpreted as manipulable members for alteration of environmental structures.

Another exemplary aspect of the invention is an imaging system for determining a plane, the imaging system includes a processor configured so as to receive a depth image. The processor is configured so as to divide a portion of a depth image into a plurality of areas, fit a two-dimensional line to depth points in each of the plurality of areas, and combine two or more of the plurality of two-dimensional lines to form a three-dimensional plane.

The above aspects may allow much faster analysis than other methods. The above aspects may also allow finding even small or fragmented areas and is resistant to low levels of noise in the image.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF EXEMPLARY EMBODIMENTS OF THE INVENTION

Figure 1:
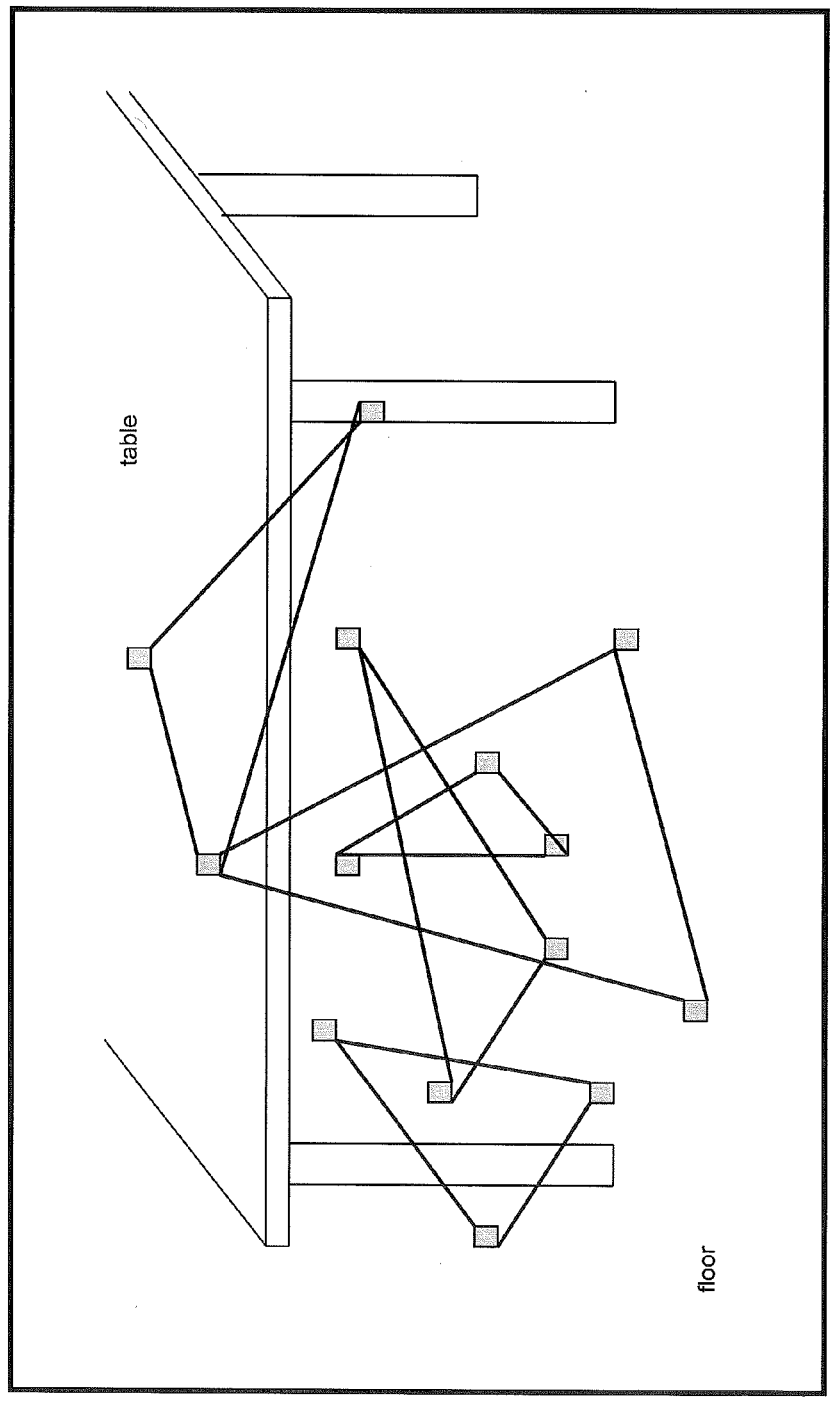
FIG. 1 illustrates a method of finding a plane using set of three points.
Figure 2B:
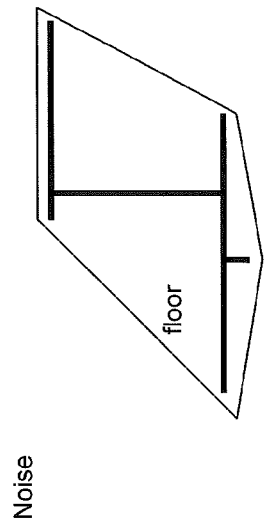
FIGS. 2a-2c illustrate a method of finding a plane by finding the 3D convex hull of the point cloud.
Figure 2C:
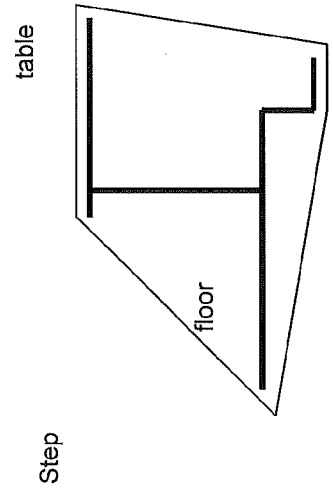
Figure 2A:
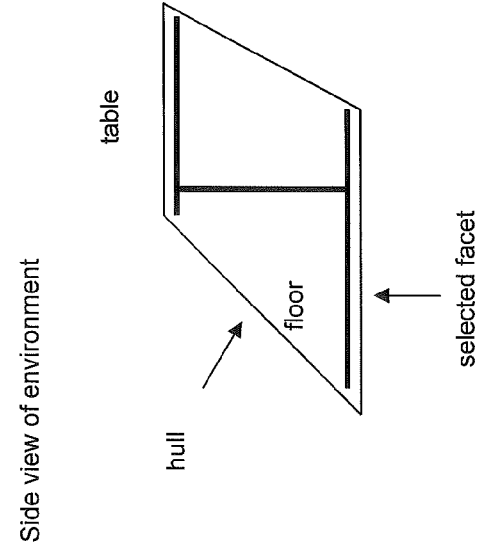
Figure 3B:
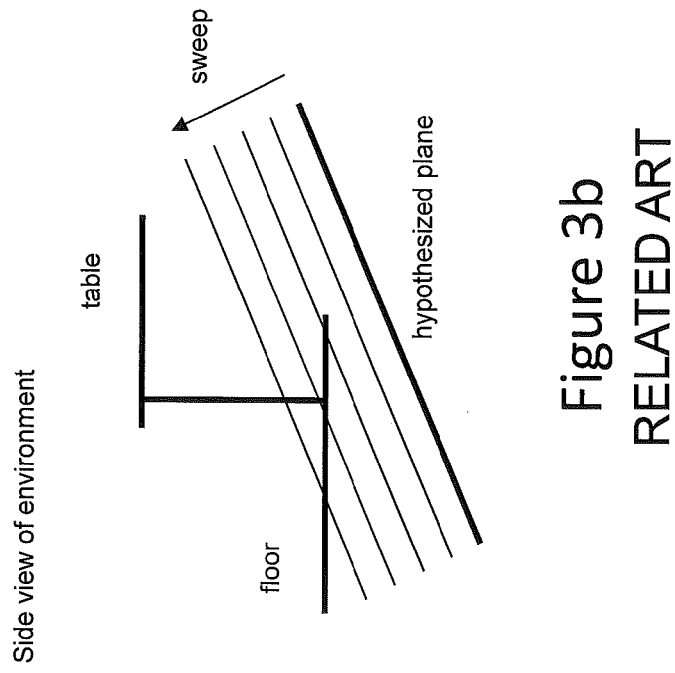
FIGS. 3a and 3b illustrate a method of finding a plane by direct plane sweeping.
Figure 3A:
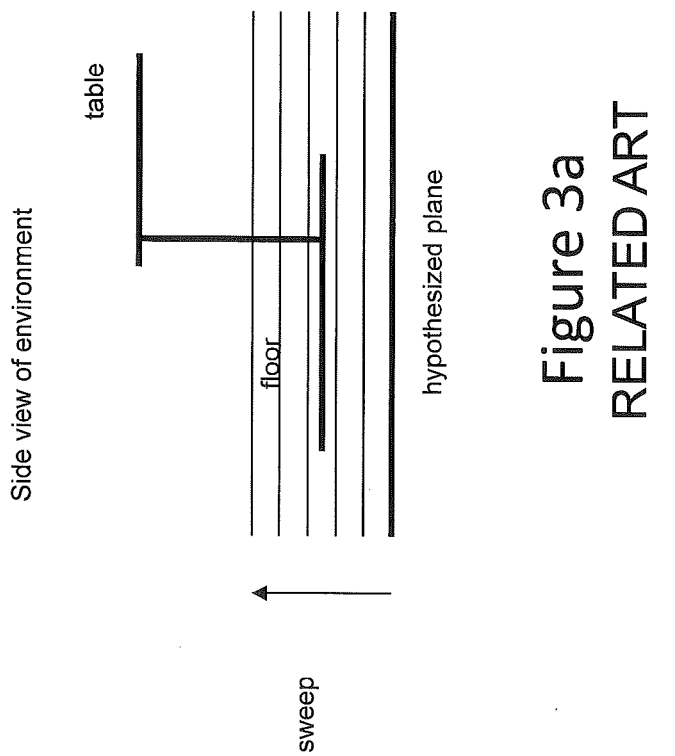

Referring now to the drawings, and more particularly to FIGS. 1-9, there are shown exemplary embodiments of the method and structures according to the present invention.

An exemplary aspect of the invention applies to situations in which the objective is to find horizontal surfaces and where the depth images has only a small amount of roll relative to vertical (e.g. less than 15 degrees). This covers many practical cases for robots on indoor flat floors with pan and tilt cameras mounted on a vertical axis, or to robots with attitude sensing (e.g. inertial measurements) whereby the camera image can be pre-corrected to have small roll.

Figure 4:
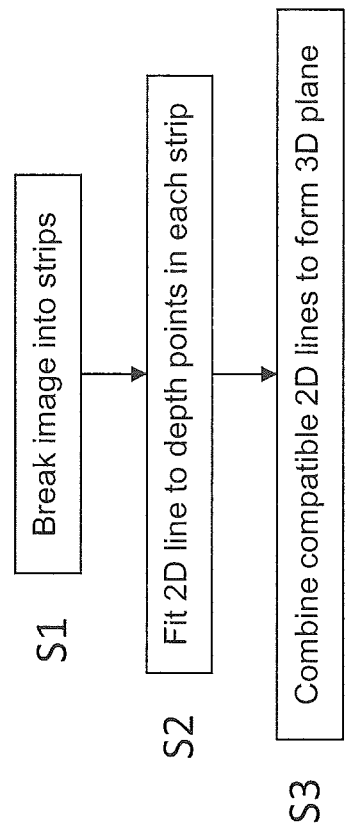
FIG. 4 illustrates an exemplary method for finding a flat surface in an image.

An exemplary embodiment, as illustrated in FIG. 4, includes breaking the image into a plurality of laterally adjacent areas (S1) and, in each of these areas, doing a linear 2D fit to the surface (S2). The resulting plurality of line estimates are then combined into a 3D planar estimate for the surface (S3). This is much faster than the RANSAC method, and does not have the extrema requirement of the convex hull method.

While exemplary embodiments of the invention will be described as breaking the image into laterally adjacent areas for simplicity, the image may be broken up into horizontal areas or areas with a roll/pitch relative to horizontal or vertical. In addition, the areas need not be continuous or adjacent but may be spaced apart in either direction in order to sample the image. In addition, the image can be broken into areas/shapes other than strips and the areas can be of different sizes.

In an exemplary embodiment, the depth image, or a selected portion of it, is broken into several (e.g. 8) vertical strips. The image can be optionally rectified to remove lens distortion before subdivision. Within each strip, each horizontal scanline is then examined to find the point with greatest vertical declination from the optical axis (equivalent to the maximum depth for a simple pin-hole optical model). Optionally the image can be decimated (e.g. by 4) in one or both directions to reduce the number of points considered.

Figure 5:
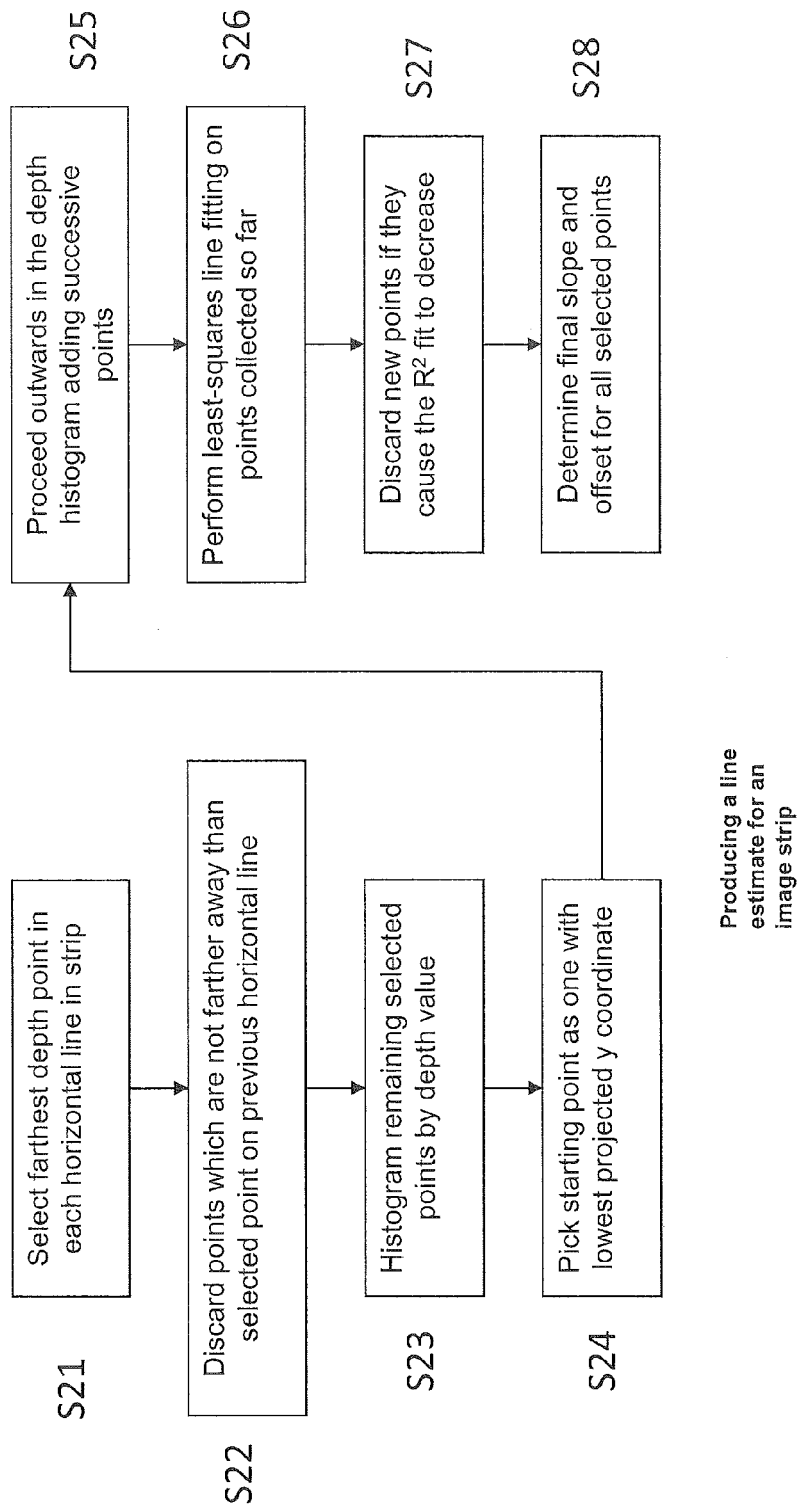
FIG. 5 illustrates an exemplary method for fitting 2D lines in an image.

As illustrated in FIG. 5, all such candidates are collected for a strip and then roughly sorted by depth using a histogramming (insertion hashing) approach progressing from the one end (e.g. bottom) of the strip to the other (e.g. top). A point is omitted (e.g., the square points in FIG. 7) if its depth does not increase relative to the point selected on the line below it—a basic planar projection constraint. This is for a camera view in which the desired horizontal surface (e.g. the floor) is situated below the optical axis. For instance, in an exemplary embodiment, the farthest depth point in each horizontal line in the strip is selected (S21). If this point is not further away than the selected point on the previous horizontal line then it is discarded (S22). Then, a histogram of the remaining selected points is created with bins based on depth values (S23).

Next, the point with the lowest real-world y-coordinate is chosen as a starting point, since it is most likely to be on the surface (e.g., floor) (S24). Progressing either outward in depth (e.g., for a camera tilted down) or inward (e.g., for a camera tilted up) within the sorted array of points, adjacent points are added to an evolving line description (S25). After a certain number of points have been accumulated (e.g., 10), a line fitting can be performed (S26). Then, the $R^2$ correlation coefficient for least-squares fitting is examined as each new point is added (S27). If this value decreased more than a certain amount (e.g., at all) when a point is added, that point is omitted from the line (e.g., the circle points in FIG. 7). In this way, collections of points presumed to be on the desired surface are found within each strip. The final slope and offset can then be determined for all selected points (S28).

Figure 6:
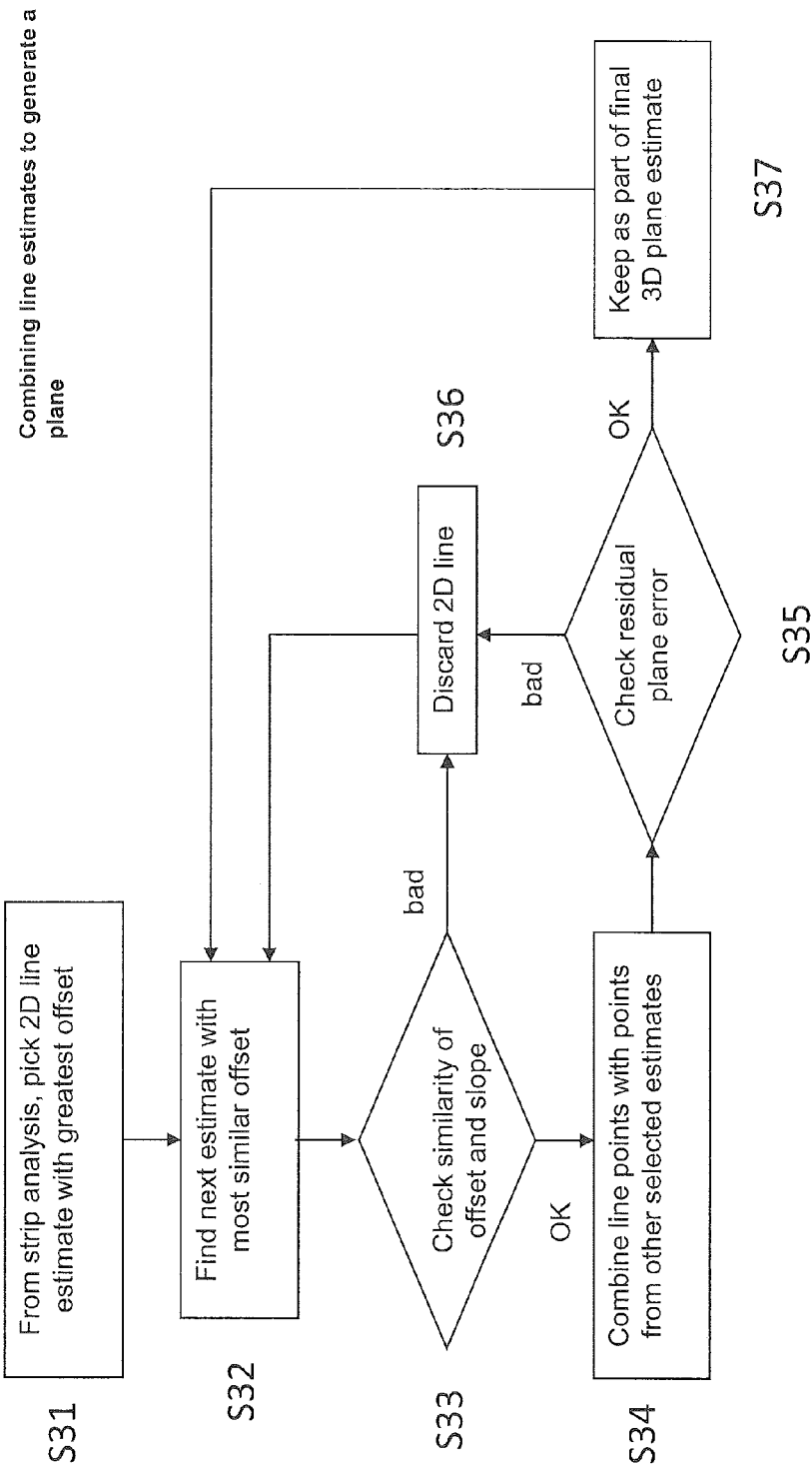
FIG. 6 illustrates an exemplary method for generating a 3D plane estimate.

Finally, as illustrated in FIG. 6, the line estimates from all the strips are combined to fit a plane. Lines with too few points or too low an $R^2$ score are discarded. Note that the line within a strip will generally lie on the true plane since the image is known to have a low amount of roll. However, by using multiple strips the roll parameter can also be estimated (which would not work if there was only a single strip). Thus, a plane pitched relative to the vertical or horizontal axis can be found. This may be useful if the detectors/cameras on the robot are tilted relative to the plane.

The lines are combined by starting with the valid line with the lowest real-word y offset (plane height) as the seed (S31). The remaining lines are then examined to find the most similar in height (S32). If this difference is not too great and the tilt of the line is not too dissimilar to the seed (S33), the points of the two lines are combined to generate a plane estimate (S34), otherwise the line is discarded (S35). If the average residual point error of this plane is significantly worse than the previous estimate (S36), then the line is omitted (S35), otherwise the line points are kept as part of the final 3D estimate (S37). This merging of lines then continues with the next closest in height until all valid lines have been examined. If fewer than n lines (e.g. 2) can be merged with the current seed, the next lowest line is chosen as the seed and the process repeats.

After this, the 3D parameters of a plane have been found (or the system declares that it cannot find any valid plane). As before, this can then be used to locate obstacles and objects by looking at deviations of more than z from the surface.

Figure 7:
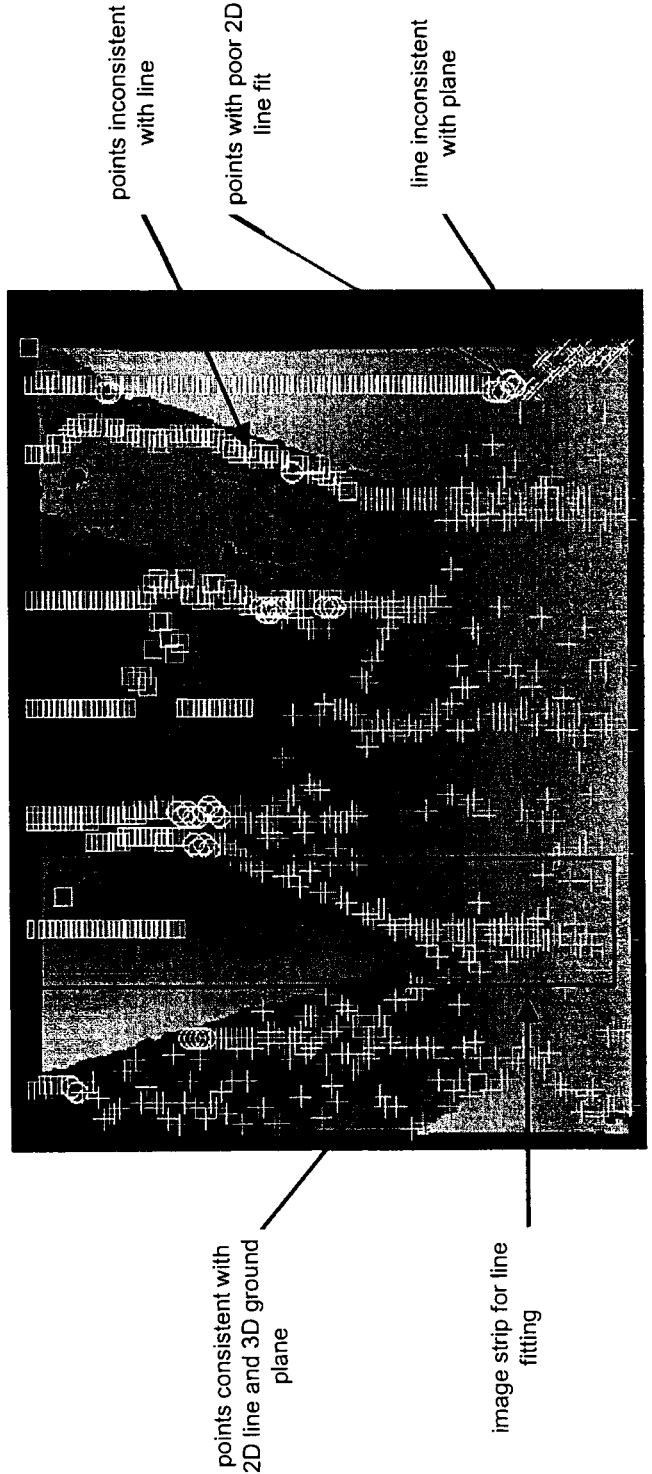
FIG. 7 illustrates an exemplary analysis of an image.

FIG. 7 shows the line points found in each of 8 bands overlaid on the depth image (dark is far). The plus points "+" are part of valid line estimates. The square points fail the monotonicity constraint while the circle points fail the $R^2$ smoothness test. The "X" points are part of a valid line estimate, but that line was not merged into the final plane estimate since these points were not consistent with the plane estimate.

Figure 8:
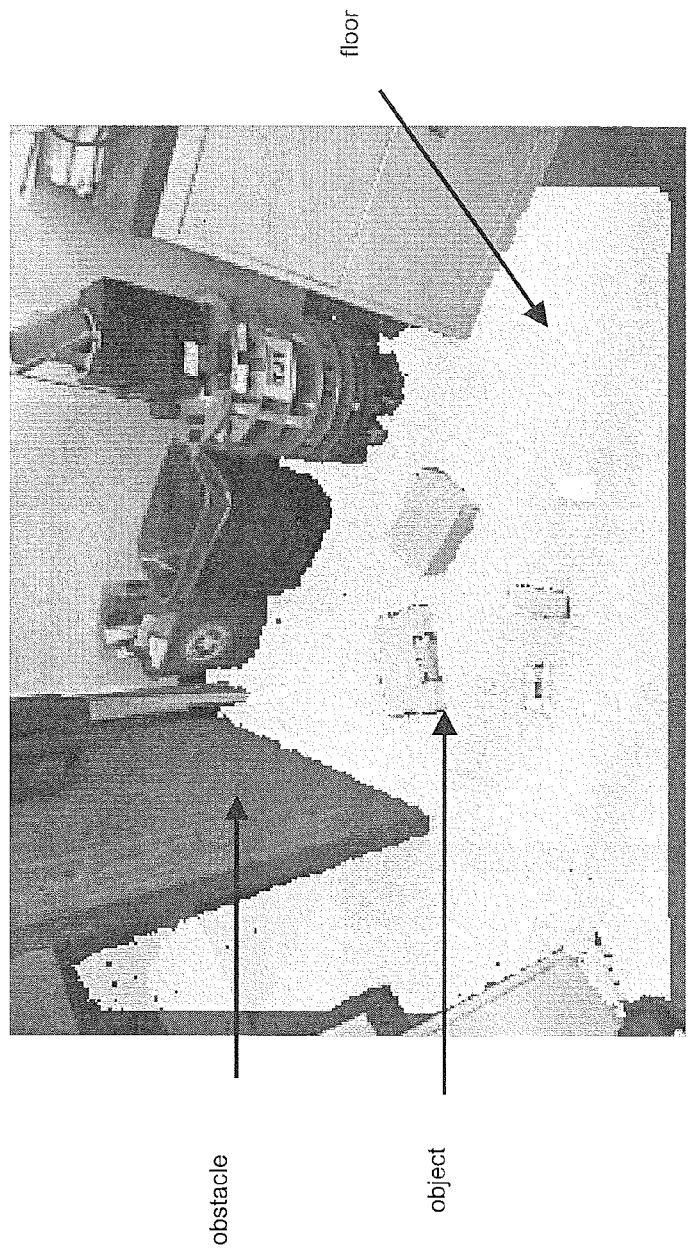
FIG. 8 illustrates an exemplary image in which a floor has been determined.

FIG. 8 shows the equivalent plane found. As can be seen, it delimits the clear (navigable) areas of the floor as constrained by the door and the file cabinet. It also highlights a box on the floor which the robot can either choose to grab or swerve around.

As noted above, while areas are described as laterally adjacent 2D areas, in practice the areas can be horizontal, at some angle relative to vertical or horizontal based on a robot roll estimate, or the image can be rotated before processing. In addition, the size and shape of the areas may be different, even within the image. The areas may also be non-continuous in either 2D direction to allow sampling of an image. The areas should be spaced in a direction orthogonal to the direction in which the area extends.

While the method has been described as finding the surface of a floor or table, it can also be used to find the wall, and objects thereon, or any other relatively planar surface (e.g., door and knob, drawer face and handle, wall and light switch).

Generally, the above method can be applied to any three dimensional image. The image may be generated by any means of producing a 3D image (or data sets known as 2½-dimensional, where the information behind an object is not known), passive stereo, active stereo methods, time of flight methods, etc. Examples of devices which can generate a depth image include the use of Microsoft's Kinect®, stereo cameras, radar, ultrasound, optical time-of-flight, conversion of a 2D image to a 3D image, or any other technique used to generate a 3D image.

Figure 9:
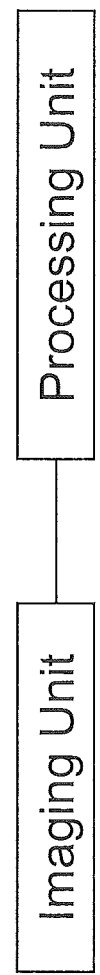
FIG. 9 illustrates an exemplary embodiment of an imaging system.

FIG. 9 illustrates an exemplary imaging system which includes an imaging unit and a processing device. The imaging unit can be any system which generates a depth image while the processing device can be either specialized hardware or software implemented on a more general processing device. Such an exemplary embodiment can be incorporated into any type of vehicle, robot, automated device or sensory package.

While the invention has been described in terms of exemplary embodiments, those skilled in the art will recognize that the invention can be practiced with modification within the spirit and scope of the appended claims.

Further, it is noted that, Applicant's intent is to encompass equivalents of all claim elements, even if amended later during prosecution.

The invention claimed is:

1. A method of determining a plane in a depth image, the method comprising:
    dividing a portion of a depth image into a plurality of areas;
    fitting a two-dimensional line to depth points in each of the plurality of areas; and
    combining two or more of the plurality of two-dimensional lines to form a three-dimensional plane estimate,
    wherein the plurality of areas are greater than one pixel in each direction, and
    wherein the fitting the two-dimensional line further includes:
        dividing the area into a plurality of scan lines;
        selecting a depth point with a highest depth value out of a set of the depth points on each of the plurality of scan lines;
        discarding depth points which are not further away than the farthest depth point on an adjacent scan line of the plurality of scan lines; and
        fitting remaining depth points of the set of the depth points so as to calculate the two-dimensional line.

2. The method according to claim 1, wherein the combining the two or more of the plurality of two-dimensional lines to form the three-dimensional plane includes:
    selecting a first two-dimensional line of the two-dimensional lines having a greatest offset of the two-dimensional lines;
    selecting a second two-dimensional line of the two-dimensional lines having a closest offset to the offset of the selected first two-dimensional line; and
    comparing the first two-dimensional line with the second two-dimensional line and adding the second two-dimensional line to the three-dimensional plane estimate if the comparison is acceptable.

3. The method according to claim 1, further comprising:
    determining environmental areas consistent with the three-dimensional plane estimate,
    wherein the areas consistent with the three-dimensional plane estimate are considered obstacle-free.

4. The method according to claim 1, further comprising:
    determining areas inconsistent with the three-dimensional plane estimate,
    wherein the areas inconsistent with the three-dimensional plane estimate are interpreted as objects.

5. The method according to claim 1, further comprising:
    rotating the depth image by 90 degrees such that a substantially vertical surface becomes a substantially horizontal surface in the image.

6. The method according to claim 1, further comprising:
    determining compact areas inconsistent with the three-dimensional plane estimate,
    wherein the areas inconsistent with the three-dimensional plane estimate are interpreted as manipulable members for alteration of environmental structures.

7. A non-transitory computer-readable medium tangibly embodying a program of machine-readable instructions executable by an apparatus to perform a method of determining a plane, the method comprising:
dividing a portion of a depth image into a plurality of areas;
fitting a two-dimensional line to depth points in each of the plurality of areas; and
combining two or more of the plurality of two-dimensional lines to form a three-dimensional plane estimate,
wherein the plurality of areas are greater than one pixel in each direction, and
wherein the fitting the two-dimensional line further includes:
dividing the area into a plurality of scan lines;
selecting a farthest depth point of a set of the depth points on each of the plurality of scan lines;
discarding depth points which are not further away than the farthest depth point on an adjacent scan line of the plurality of scan lines; and
fitting remaining depth points of the set of the depth points so as to calculate the two-dimensional line.

8. The non-transitory computer-readable medium according to claim 7, wherein the combining the two or more of the plurality of two-dimensional lines to form the three-dimensional plane includes:
selecting a first two-dimensional line of the two-dimensional lines having a greatest offset of the two-dimensional lines;
selecting a another two-dimensional line of the two-dimensional lines having a closest offset to the offset of the selected first two-dimensional line; and
comparing the first two-dimensional line with the second two-dimensional line and adding the second two-dimensional line to the three-dimensional plane estimate if the comparison is acceptable.

9. The non-transitory computer-readable medium according to claim 7, further comprising:
determining environmental areas consistent with the three-dimensional plane estimate, wherein the areas consistent with the three-dimensional plane estimate are considered obstacle-free.

10. The non-transitory computer-readable medium according to claim 7, further comprising:
determining areas inconsistent with the three-dimensional plane estimate, wherein the areas inconsistent with the three-dimensional plane estimate are interpreted as objects.

11. The non-transitory computer-readable medium according to claim 7, further comprising:
rotating the depth image by 90 degrees such that a substantially vertical surface becomes a substantially horizontal surface in the image.

12. The non-transitory computer-readable medium according to claim 7, further comprising:
determining compact areas inconsistent with the three-dimensional plane estimate,
wherein the areas inconsistent with the three-dimensional plane estimate are interpreted as manipulable members for alteration of environmental structures.

13. The method according to claim 1, wherein the dividing is before the selecting, the discarding, and the fitting.

14. The method according to claim 2, wherein parameters of the two dimensional line include an angle and an offset.

* * * * *